United States Patent [19]

Shima

[11] Patent Number: 4,970,606
[45] Date of Patent: Nov. 13, 1990

[54] DOCUMENT READING APPARATUS

[75] Inventor: Masayuki Shima, Sendai, Japan

[73] Assignee: Ricoh Company, Ltd., Tokyo, Japan

[21] Appl. No.: 368,187

[22] Filed: Jun. 19, 1989

[30] Foreign Application Priority Data

Jul. 27, 1988 [JP] Japan .................................. 63-187797
Jul. 27, 1988 [JP] Japan .................................. 63-187799
Aug. 2, 1988 [JP] Japan .................................. 63-193181

[51] Int. Cl.⁵ .............................................. H04N 1/04
[52] U.S. Cl. ..................................... 358/474; 355/213;
358/494; 358/496; 358/498
[58] Field of Search ............... 358/474, 486, 487, 488,
358/494, 496, 497, 498, 473; 355/308, 309, 233,
234, 210, 211, 213

[56] References Cited

U.S. PATENT DOCUMENTS 4,908,718  3/1990  Shimada ........................... 358/494

FOREIGN PATENT DOCUMENTS 3611850  10/1986  Fed. Rep. of Germany .
72517     6/1978   Japan .
005316    5/1979   Japan .
31662     8/1980   Japan .
0024268   2/1983   Japan .
0043659   3/1983   Japan .
23794     5/1983   Japan .
0159057   9/1983   Japan .
2423      1/1984   Japan .
0210766   11/1984  Japan .
0047553   3/1985   Japan .
0210054   10/1985  Japan .
80466     5/1987   Japan .
44614     11/1987  Japan .

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

A document reading apparatus comprises a contact type image sensor having a protection glass located at a surface where a document is to be read, first roller mechanism for supplying a document which is to be read in a document transport direction on the protection glass of the contact type image sensor, a platen roller which is rotatably supported at a position confronting the protection glass, a support mechanism for rotatably supporting the platen roller, and a restricting mechanism. The support mechanism permits a movement of the platen roller in a predetermined direction which is approximately perpendicular to a surface of the protection glass depending on a thickness of the document which is supplied between the platen roller and the protection glass by the first roller mechanism. The restricting mechanism restricts a position of the platen roller to a predetermined position when no document is inserted between the platen roller and the protection glass so that a predetermined gap is formed therebetween.

28 Claims, 9 Drawing Sheets

4,970,606

DOCUMENT READING APPARATUS

BACKGROUND OF THE INVENTION

The present invention generally relates to document reading apparatuses, and more particularly to a document reading apparatus which uses a contact type image sensor.

Conventionally, there are document reading apparatuses which use a contact type image sensor. FIG. 1 shows a typical example of such conventional document reading apparatuses.

The conventional document reading apparatus shown in FIG. 1 has a contact type image sensor 5 which includes a transparent protection (or contact) glass 1, a light emitting diode (LED) array 2 having an array of LEDs, a rod lens array 3 having an array of rod lenses, a photoelectric conversion element array 4 having an array of photoelectric conversion elements and the like. A white guide plate 8 confronts a surface of the protection glass 1 of the contact type image sensor 5. A predetermined gap is formed between the white guide plate 8 and the surface of the protection glass 1. Document transport roller pairs 9 and 10 are respectively provided on both sides of the contact type image sensor 5. For example, a document 7 is transported between the white guide plate 8 and the protection glass 1 by the document transport roller pair 9 and is read by the contact type image sensor 5. After the document 7 is read, the document 7 is ejected by the document transport roller pair 10.

FIG. 2 shows a conceivable document reading apparatus. In FIG. 2, those parts which are essentially the same as those corresponding parts in FIG. 1 are designated by the same reference numerals, and a description thereof will be omitted. In the document reading apparatus shown in FIG. 2, a rotatable platen roller 6 makes contact with the protection glass 1 at a document reading position "A" of the contact type image sensor 5. An outer peripheral portion of the platen roller 5 is made of a white resilient material. The document 7 is read when the document 7 is transported in a state pinched between the protection glass 1 and the platen roller 6.

However, the document reading apparatus shown in FIG. 2 suffers problems in that the outer peripheral surface of the platen roller 6 easily becomes dirty due to the contact with the document 7, and it is difficult to completely remove the dirt on the platen roller 6 especially because the outer peripheral portion of the platen roller 6 is made of a resilient material such as rubber. In other words, when the outer peripheral portion of the platen roller 6 is made of rubber, for example, very fine dirt adheres on the rubber surface which actually has minute irregularities and such dirt often cannot be removed by an alcohol remover (or cleaner) or the like. For this reason, the white surface of the platen roller 6 cannot be maintained perfectly white because of the dirt which is difficult to remove, and as a result, a shading correction of the contact type image sensor 5 cannot be carried out accurately and the reading accuracy becomes poor. In addition, since the platen roller 6 is pushed against the surface of the protection glass 1 until the document 7 reaches the document reading position "A", a large load acts on the platen roller 6 when rotating the platen roller 6.

On the other hand, according to the document reading apparatus shown in FIG. 1, the white guide plate 8 does not easily become dirty like the platen roller 6 of FIG. 2 because the document 7 is transported within the gap formed between the white guide plate 8 and the protection glass 1. However, there are problems in that the document 7 easily floats from the surface of the protection glass 1 due to the gap and an out-of-focus state is generated thereby. The out-of-focus state is easily generated by a slight floating of the document 7 because a focal distance of the optical system of the contact type image sensor 5 is short. This out-of-focus state is notable especially when the document 7 is a thick and stiff paper, includes folds and the like. In order to prevent the out-of-focus state, it is conceivable to reduce the gap between the white guide plate 8 and the protection glass 1 or to make the white guide plate 8 push against the surface of the protection glass 1 by the weight of the white guide plate 8 itself. However, a satisfactory document transport cannot be achieved when either of such measures is taken especially when the document 7 is a thin paper such as an onion skin paper, and a paper jam is likely to occur. Furthermore, when the white guide plate 8 becomes dirty due to the contact with the document 7, it is difficult to carry out an accurate shading correction of the contact type image sensor 5 and the reading accuracy becomes poor.

SUMMARY OF THE INVENTION

Accordingly, it is a general object of the present invention to provide a novel and useful document reading apparatus in which the problems described above are eliminated.

Another and more specific object of the present invention is to provide a document reading apparatus comprising a contact type image sensor having a protection glass located at a surface where a document is to be read, first roller means for supplying a document which is to be read in a document transport direction on the protection glass of the contact type image sensor, a platen roller which is rotatably supported at a position confronting the protection glass, a support mechanism for rotatably supporting the platen roller, and restricting means. The support mechanism permits a movement of the platen roller in a predetermined direction which is approximately perpendicular to a surface of the protection glass depending on a thickness of the document which is supplied between the platen roller and the protection glass by the first roller means. The restricting means restricts a position of the platen roller to a predetermined position when no document is inserted between the platen roller and the protection glass so that a predetermined gap is formed between the protection glass and the outer peripheral surface of the platen roller in the predetermined position. According to the document reading apparatus of the present invention, an out-of-focus state of the contact type image sensor is prevented because the document is prevented from floating from the surface of the protection glass. Furthermore, it is possible to prevent a paper jam even when the document has a small paper thickness, and a paper jam is positively prevented at an entrance side of the platen roller because the platen roller is movable along the predetermined direction and rotates as the document is transported.

Still another object of the present invention is to provide the document reading apparatus wherein at least an outer peripheral portion of the platen roller is made of a hard material selected from a group including metals and plastics. According to the document reading apparatus of the present invention, it is easy to clean the white outer peripheral surface of the platen roller even if dirt should adhere on the white outer peripheral surface.

A further object of the present invention is to provide the document reading apparatus in which the outer peripheral surface of the platen roller is basically white. According to the document reading apparatus of the present invention, due to the provision of the predetermined gap between the protection glass and the outer peripheral surface of the platen roller, it is possible to prevent the white outer peripheral surface of the platen roller from becoming dirty so that the white outer peripheral surface can be used for a shading correction.

Another object of the present invention is to provide the document reading apparatus wherein a pushing force of the platen roller acting on the document against the protection glass is approximately constant regardless of the thickness of the document. According to the document reading apparatus of the present invention, it is possible to stably transport the document regardless of the paper thickness of the document.

Still another object of the present invention is to provide the document reading apparatus which further comprises pushing means for pushing the platen roller towards the protection glass. According to the document reading apparatus of the present invention, it is possible to positively prevent the document from floating from the surface of the protection glass even when the document has a large paper thickness and is stiff.

A further object of the present invention is to provide the document reading apparatus which further comprises driving means for rotating the platen roller at a peripheral speed approximately equal to a transport speed of the document. According to the document reading apparatus of the present invention, a stable document transport is ensured.

Another object of the present invention is to provide the document reading apparatus wherein the first roller means includes a roller which is provided adjacent to the platen roller and the roller of the first roller means makes contact with the protection glass. According to the document reading apparatus of the present invention, it is possible to positively prevent a paper jam even when the document has a small paper thickness.

Other objects and further features of the present invention will be apparent from the following detailed description when read in conjunction with the accompanying drawings.

DESCRIPTION OF THE PREFERRED EMBODIMENTS

Figure 1:
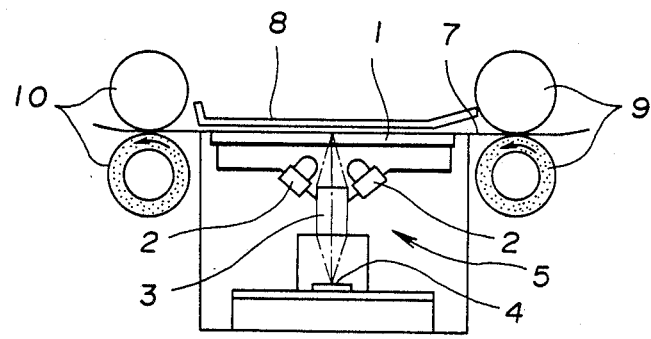
FIG. 1 is a side view showing an essential part of a conventional document reading apparatus.
Figure 2:
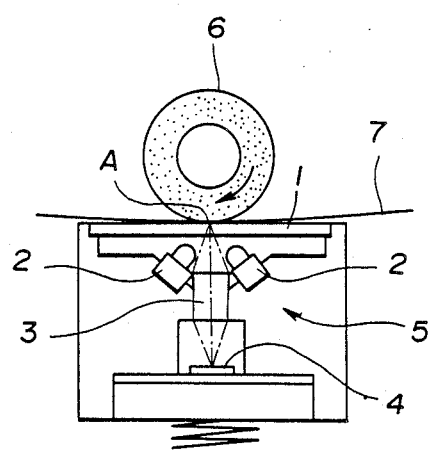
FIG. 2 is a side view showing an essential part of a conceivable document reading apparatus.
Figure 3:
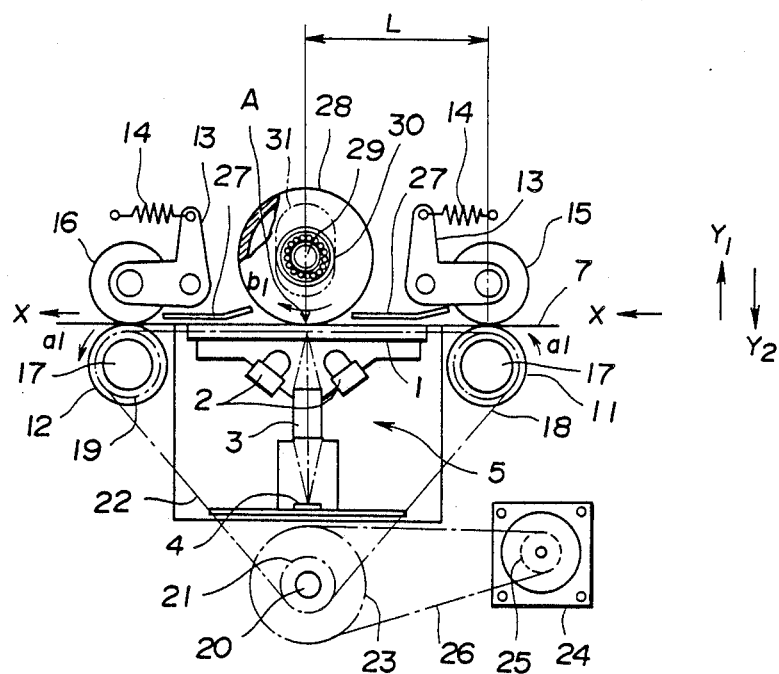
FIG. 3 is a side view showing an essential part of a first embodiment of a document reading apparatus according to the present invention.

First, a description will be given of a first embodiment of a document reading apparatus according to the present invention, by referring to FIG. 3. In FIG. 3, those parts which are substantially the same as those corresponding parts in FIGS. 1 and 2 are designated by the same reference numerals for the sake of convenience, and a description thereof will be omitted. Document transport rollers 11 and 12 are respectively provided on both sides of the contact type image sensor 5. Pressure rollers 15 and 16 resiliently push against corresponding document transport rollers 11 and 12 by actions of corresponding arms 13 and springs 14. Driving pulleys 18 and 19 are fixed on rotary shafts 17 of the corresponding document transport rollers 11 and 12. A driving belt 22 is provided around the driving pulleys 18 and 19 and a small diameter pulley 21 which is fixed on a rotary shaft 20 provided below the contact type image sensor 5. A driving belt 26 is provided around a large diameter driving pulley 23 which is fixed on the rotary shaft 20 and a driving pulley 25 which is fixed on a rotary shaft of a driving motor 24.

A pair of guide plates 27 are provided above the protection glass 1 so that a predetermined gap is formed between the guide plates 27 and the surface of the protection glass 1. An outer peripheral surface of a platen roller 28 makes contact with the surface of the protection glass 1. Shafts 29 provided on both ends of the platen roller 28 are supported by corresponding bearings 30, and each bearing 30 engages an elongated hole 31 in a sidewall 500 of a cover (not shown) which covers the contact type image sensor 5 so that each bearing 30 is freely movable in vertical directions $Y_1$ and $Y_2$ in FIG. 3, that is, movable up and down. In other words, the elongated hole 31 extends in a direction approximately perpendicular to a document transport direction X in which the document 7 is transported. At least an outer peripheral portion of the platen roller 28 is made of a hard material such as metals and plastics, and the outer peripheral surface of the platen roller 28 is coated or plated to a basically white finish.

In a state before reading of the document 7, the platen roller 28 is located at a lower position and the outer peripheral surface of the platen roller 28 pushes against the surface of the protection glass 1 due to its own weight.

When a power source is turned ON and a start button (not shown) is pushed to start the reading of the document 7, the driving motor 24 is rotated to drive the driving belts 26 and 22 and the driving pulleys 25, 23, 21, 19, 18 and the like, and the document transport rollers 11 and 12 rotate in a direction al. On the other hand, the document 7 is separated by a document separating and transporting mechanism (not shown) and reaches a position between the document transport roller 11 and the pressure roller 15. Hence, the document 7 is pushed between the protection glass 1 and the guide plate 27 when the document transport roller 11 rotates. When a tip end of the document 7 hits the platen roller 28, the document 7 enters below the platen roller 28 due to the stiffness of the paper because a distance L between centers of the rollers 15 and 28 along the document transport direction X is approximately 30 mm, for example. As a result, the platen roller 28 is pushed upwards in the direction $Y_1$ depending on the paper thickness of the document 7. Because the shafts 29 on both ends of the platen roller 28 are supported by the respective bearings 30 when the platen roller 28 is pushed upwards, a load which acts on the platen roller 28 is small and the platen roller 28 rotates in a direction b1 to help the transport of the document 7. Because the platen roller 28 rotates in the direction b1 and is movable upwardly away from the surface of the protection glass 1, the transport characteristic of the document 7 is improved and a generation of a paper jam is prevented. When the tip end of the document 7 reaches the document reading position "A", the contact type image sensor 5 starts reading the document 7. The document reading position "A" is detected by a photosensor (not shown) or the like which is located between the platen roller 28 and the rollers 16 and 12.

During a time in which the document 7 is read by the contact type image sensor 5, the document 7 is pushed against the surface of the protection glass 1 by the weight of the platen roller 28. For this reason, the document 7 is prevented from floating from the surface of the protection glass 1 and the out-of-focus state is thus prevented from occurring. In addition, since the platen roller 28 moves in the vertical directions $Y_1$ and $Y_2$ along the elongated holes 31 depending on the paper thickness of the document 7, the document 7 is always pushed against the surface of the protection glass 1 by the platen roller 28 with an approximately constant pushing force regardless of the paper thickness of the document 7.

On the other hand, when the illumination is not uniform, the sensitivities of the photoelectric conversion elements of the photoelectric conversion element array 4 are inconsistent, a quantity of surrounding light decreases or the like, the reading accuracy becomes poor. Usually, a white reference member is read before actually reading the document 7 to make a shading correction so as to improve the reading accuracy. The shading correction electrically corrects outputs of the photoelectric conversion elements depending on the outputs obtained when the white reference member is read. A known shading correction such as that proposed in a Japanese Laid-Open Patent Application No. 57-104370 may be employed. In this embodiment, the outer peripheral surface of the platen roller 28 is basically white, and it is thus possible to make the shading correction by reading the outer peripheral surface of the platen roller 28. In addition, since the platen roller 28 is made of a hard material and not a resilient material used conventionally, dirt does not adhere easily on the platen roller 28. Even when dirt should adhere on the platen roller 28, the dirt can be easily removed by an alcohol remover or the like because the surface of the hard material is easy to clean compared to the surface of the resilient member. Further, because the platen roller 28 rotates as the document 7 is transported and there is no sliding contact takes place between the platen roller 28 and the document 7, the surface of the platen roller 28 is prevented from dirt and damage. Accordingly, the outer peripheral surface of the platen roller 28 can be maintained in the basically white state which is suited for use in the shading correction over a long period of time, and it is possible to always carry out a highly accurate shading correction.

Figure 4:
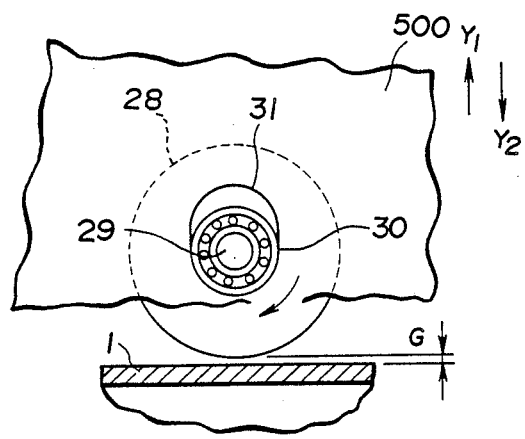
FIG. 4 is a side view showing an essential part of a second embodiment of the document reading apparatus according to the present invention.

Next, a description will be given of a second embodiment of the document reading apparatus according to the present invention, by referring to FIG. 4. In FIG. 4, those parts which are substantially the same as those corresponding parts in FIG. 3 are designated by the same reference numerals, and a description thereof will be omitted. In this embodiment, a minute gap G is formed between the platen roller 28 which is located at a lowest position and the surface of the protection glass 1. The platen roller 28 is closest to the surface of the protection glass 1 at the lowest position. For example, the minute gap G is in a range of 0.05 mm to 0.1 mm.

Accordingly, when the document 7 is a thin paper such as an onion skin paper having a thickness of 0.05 mm to 0.1 mm, the document 7 is not pushed by the platen roller 28 and the transport characteristic is improved with respect to the document 7 having a small paper thickness. As a result, a paper jam which is likely to occur conventionally when the document 7 is a thin paper is positively prevented in this embodiment. An out-of-focus state is virtually eliminated in this embodiment even when the platen roller 28 does not push the document 7 because the minute gap G is extremely small and the document 7 is unlikely to float from the surface of the protection glass 1 when the paper thickness of the document 7 is small. The effect of smoothly transporting the document 7 is obtainable even when the gap G is approximately zero, and the document 7 having a small paper thickness can be transported satisfactorily.

Figure 5:
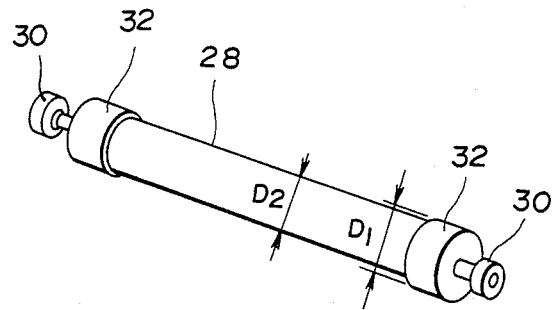
FIG. 5 is a perspective view showing an essential part of a third embodiment of the document reading apparatus according to the present invention.

Next, a description will be given of a third embodiment of the document reading apparatus according to the present invention, by referring to FIG. 5. In FIG. 5, those parts which are substantially the same as those corresponding parts in FIGS. 3 and 4 are designated by the same reference numerals, and a description thereof will be omitted. In this embodiment, the platen roller 28 has a diameter $D_2$, and large diameter portions 32 having a diameter $D_1$ are provided at both ends of the platen roller 28, $D_1 > D_2$. The large diameter portions 32 make contact with the surface of the protection glass 1 so that the minute gap G is formed between the platen roller 28 and the surface of the protection glass 1, where $G = (D_1 - D_2)/2$. As in the case of the second embodiment, the minute gap G is set in the range of 0.05 mm to 0.1 mm, for example. Hence, it is possible to obtain effects similar to those obtainable in the second embodiment, that is, the transport characteristic of the document 7 having the small paper thickness is improved, the paper jam is positively prevented and the out-of-focus state is prevented.

Figure 6:
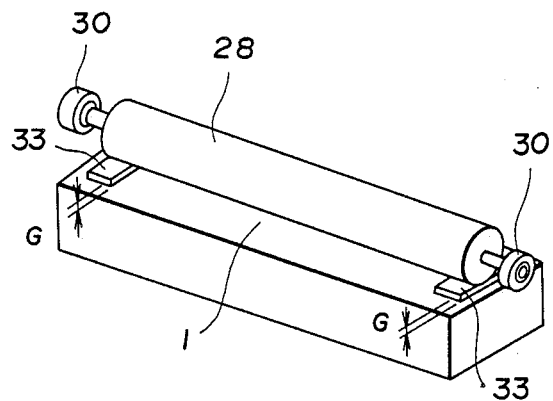
FIG. 6 is a perspective view showing an essential part of a fourth embodiment of the document reading apparatus according to the present invention.

Next, a description will be given of a fourth embodiment of the document reading apparatus according to the present invention, by referring to FIG. 6. In FIG. 6, those parts which are substantially the same as those corresponding parts in FIGS. 3 and 4 are designated by the same reference numerals, and a description thereof will be omitted. In this embodiment, spacers 33 having a thickness G are provided on the protection glass 1 at positions corresponding to the two ends of the platen roller 28. Hence, when the platen roller 28 makes contact with the spacers 33, the minute gap G is formed between the platen roller 28 and the surface of the protection glass 1. As in the case of the second embodiment, the minute gap G is set in the range of 0.05 mm to 0.1 mm, for example. Hence, it is possible to obtain effects similar to those obtainable in the second embodiment, that is, the transport characteristic of the document 7 having the small paper thickness is improved, the paper jam is positively prevented and the out-of-focus state is prevented.

Figure 7:
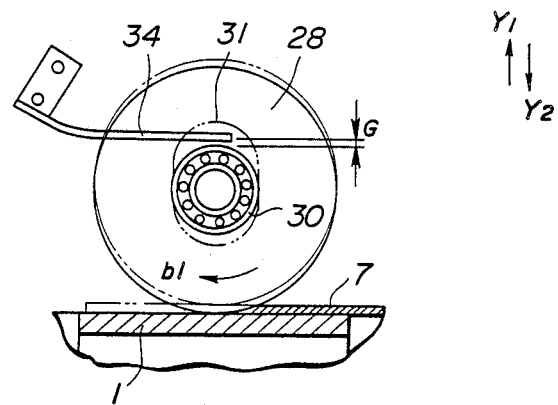
FIG. 7 is a side view showing an essential part of a fifth embodiment of the document reading apparatus according to the present invention.

Next, a description will be given of a fifth embodiment of the document reading apparatus according to the present invention, by referring to FIG. 7. In FIG. 7, those parts which are substantially the same as those corresponding parts in FIGS. 3 and 4 are designated by the same reference numerals, and a description thereof will be omitted. In this embodiment, a resilient member 34 is fixed to the cover and engages an upper portion of the bearing 30. A platen roller pushing mechanism is constituted by the resilient member 34. When the platen roller 28 is in contact with the surface of the protection glass 1, a gap G is formed between the resilient member 34 and the bearing 30. For example, this gap G is in the range of 0.05 mm to 0.1 mm.

When reading the document 7, the platen roller 28 is pushed upwardly and the gap G gradually decreases depending on the paper thickness of the document 7. When the paper thickness of the document 7 exceeds 0.1 mm in this embodiment, the bearing 30 makes contact with the resilient member 34 and the pushing force acting on the document 7 against the surface of the protection glass 1 is a sum of the pushing force exerted by the weight of the platen roller 28 and the pushing force exerted by the resilient member 34. In addition, the pushing force exerted by the resilient member 34 increases as the paper thickness of the document 7 increases. Hence, the document 7 is positively prevented from floating from the surface of the protection glass 1 even when the paper thickness is large and the paper is stiff, thereby making it possible to positively prevent an out-of-focus state which would occur if the document 7 floats. On the other hand, when the paper thickness of the document 7 is small, only the weight of the platen roller 28 acts on the document 7 and it is possible to positively prevent a generation of a paper jam even when the paper thickness of the document 7 is small.

Figure 8:
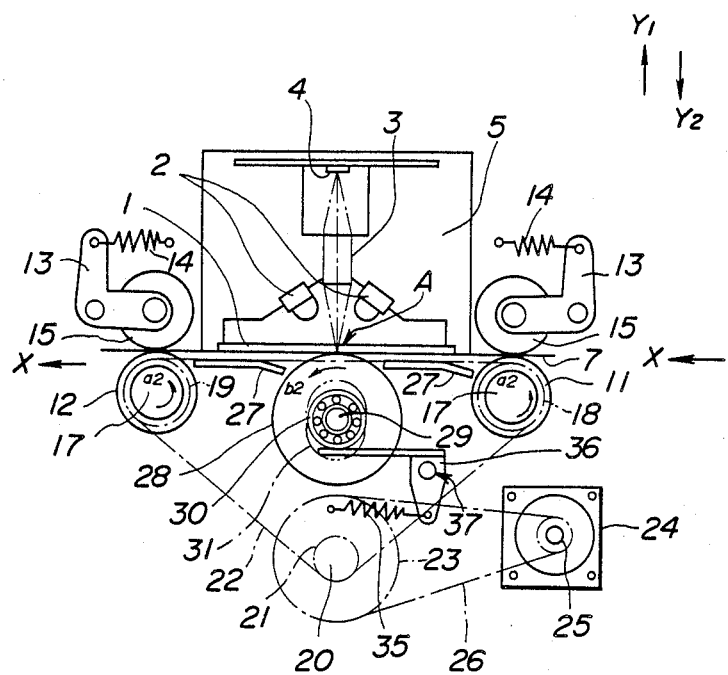
FIG. 8 is a side view showing an essential part of a sixth embodiment of the document reading apparatus according to the present invention.

Next, a description will be given of a sixth embodiment of the document reading apparatus according to the present invention, by referring to FIG. 8. In FIG. 8, those parts which are substantially the same as those corresponding parts in FIG. 3 are designated by the same reference numerals, and a description thereof will be omitted. In this embodiment, the arrangement of the contact type image sensor 5 and the platen roller 28 is upside down to that of the first embodiment in that the contact type image sensor 5 is located above the platen roller 28. In addition, a platen roller push mechanism 37 constituted by a pressure spring 35 and an actuator 36 is fixed to the cover so that a tip end of the actuator 36 engages a lower portion of the bearing 30. The document transport rollers 11 and 12 rotate in a direction a2 and the platen roller 28 rotates in a direction b2.

Accordingly, the platen roller push mechanism 37 pushes the platen roller 28 against the surface of the protection glass 1 so as to prevent the document 7 from floating from the surface of the protection glass 1. As the paper thickness of the document 7 increases, the platen roller 28 is pushed downwardly and the pushing force acting on the platen roller 28 from the platen roller push mechanism 37 increases. For this reason, the pushing force exerted by the platen roller push mechanism 37 increases as the paper thickness of the document 7 increases, and the document 7 is positively prevented from floating from the surface of the protection glass 1 even when the paper thickness is large and the paper is stiff, thereby making it possible to positively prevent an out-of-focus state which would occur if the document 7 floats.

Figure 9:
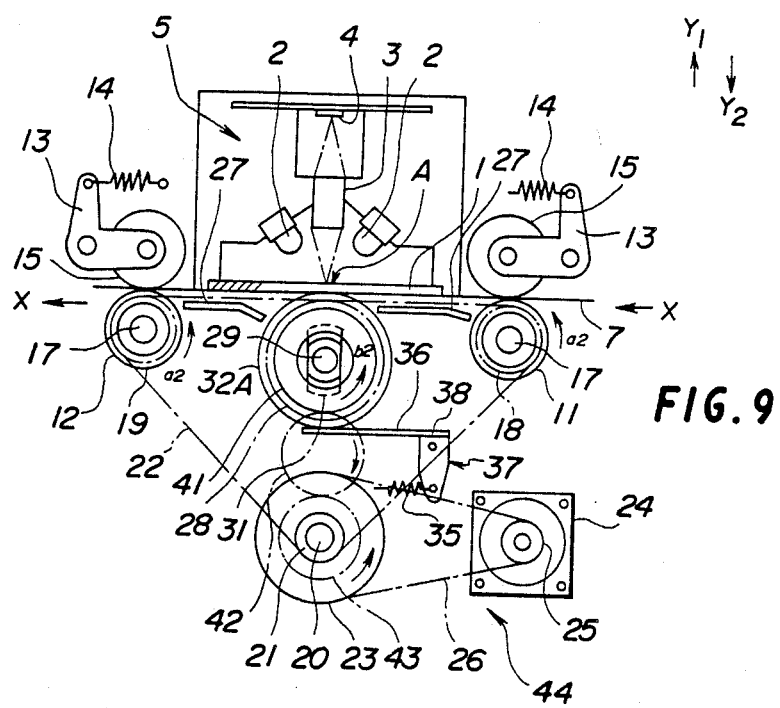
FIG. 9 is a side view showing an essential part of a seventh embodiment of the document reading apparatus according to the present invention.
Figure 10:
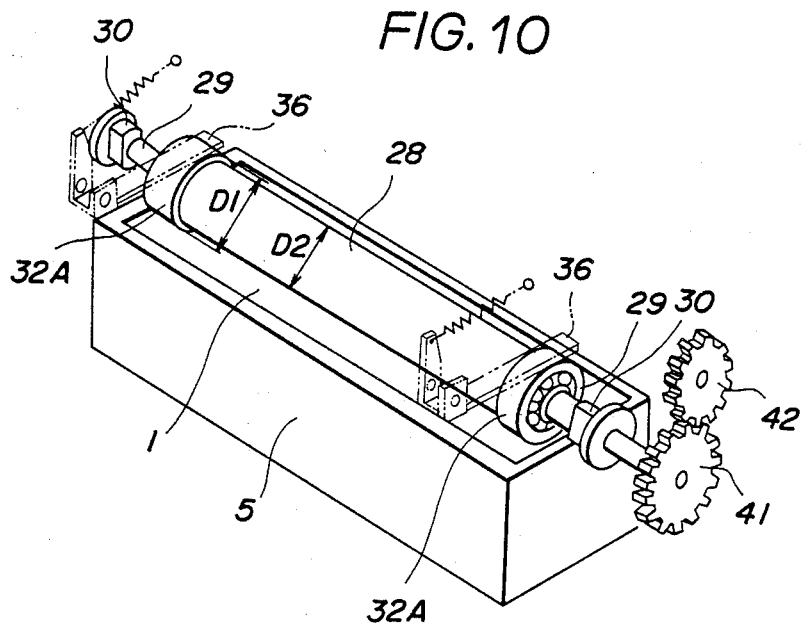
FIG. 10 is a perspective view showing an essential part of the seventh embodiment.

Next, a description will be given of a seventh embodiment of the document reading apparatus according to the present invention, by referring to FIGS. 9 and 10. In FIGS. 9 and 10, those parts which are substantially the same as those corresponding parts in FIG. 8 are designated by the same reference numerals, and a description thereof will be omitted. In this embodiment, bearings 32A are provided on both ends of the platen roller 28, and each bearing 32A has a diameter $D_1$ which is greater than a diameter $D_2$ of the platen roller 28. The actuator 36 is pivotally provided on the cover by a pin 38, and the actuator 36 pushes the lower portion of the bearing 32A by the action of the spring 35. On the other hand, the upper portion of the bearing 32A makes contact with the surface of the protection glass 1 in a range outside a document reading width, so that a minute gap G ($=D_1-D_2$) in a range of 0.05 mm to 0.1 mm is formed between the platen roller 28 and the surface of the protection glass 1 within the document reading width.

A gear 41 is fixed to a tip end of one of the shafts 29, and this gear 41 meshes an idler gear 42. The idler gear 42 is arranged at such a position that the gears 41 and 42 mesh approximately at the pitch circles when the platen roller 28 is located at a lowermost position most separated from the surface of the protection glass 1. In addition, a gear 43 which is fixed on the rotary shaft 20 meshes the idler gear 42. A driving mechanism 44 for rotating the platen roller 28 at a peripheral speed approximately equal to a transport speed of the document along the transport direction X is constituted by the gears 41, 42 and 43, the driving motor 24 and the like.

When the power source is turned ON and the start button is pushed to start the reading of the document 7, the driving motor 24 is rotated to drive the driving belts 26 and 22 and the driving pulleys 25, 23, 21, 19, 18 and the like, and the document transport rollers 11 and 12 rotate in the direction a2. In addition, the gear 43 rotates unitarily with the pulleys 23 and 21, and the gear 43 rotates the gear 41 via the idler gear 42. As a result, the platen roller 28 rotates in the direction b2 unitarily with the gear 41.

On the other hand, the document 7 is separated by the document separating and transporting mechanism and reaches the position between the document transport roller 11 and the pressure roller 15. Hence, the document 7 is pushed between the protection glass 1 and the guide plate 27 when the document transport roller 11 rotates, and the document 7 is transported in the direction X. When the tip end of the document 7 reaches the document reading position "A", the contact type image sensor 5 starts reading the document 7. After the reading of the document 7 is completed, the document 7 is transported in the direction X between the protection glass 1 and the guide plate 27. The document 7 reaches a position between the document transport roller 12 and the pressure roller 15 and is ejected to a document ejection part (not shown) by the document transport roller 12.

At the document reading position "A", the minute gap G is formed between the surface of the protection glass and the platen roller 28. In addition, the platen roller 28 rotates in the direction b2 which coincides with the document transport direction X. For these reasons, the transport characteristic of the document 7 is improved even when the paper thickness is small, and it is possible to prevent a paper jam at a position immediately before the platen roller 28 along the document transport direction X. On the other hand, when the paper thickness of the document 7 is greater than the minute gap G, the platen roller 28 moves in the direction $Y_2$ along the elongated hole 31, that is, away from the surface of the protection glass 1. Hence, the transport characteristic of the document 7 is improved even when the paper thickness is large, and it is possible to prevent a paper jam at the position immediately before the platen roller 28 along the document transport direction X.

On the other hand, the platen roller 28 is pushed in the direction $Y_1$ towards the protection glass 1 by the actuator 36, and the minute gap G is maintained between the platen roller 28 and the surface of the protection glass 1 in a normal state before the document 7 enters between the platen roller 28 and the protection glass 1. Thus, the platen roller 28 makes contact with a rear surface (surface opposite to a surface which is read) of the document 7 when the contact type image sensor 5 reads the document 7, and the document 7 is prevented from floating from the surface of the protection glass 1 thereby preventing an out-of-focus state from occurring. When the paper thickness of the document 7 is large and the platen roller 28 is moved in the direction $Y_2$ away from the surface of the protection glass 1, the pushing force on the rear surface of the document 7 increases. As a result, the document 7 is prevented from floating from the surface of the protection glass 1 even when the paper thickness is large, and the out-of-focus state is positively prevented from occurring.

On the other hand, when the illumination is not uniform, the sensitivities of the photoelectric conversion elements of the photoelectric conversion element array 4 are inconsistent, the quantity of surrounding light decreases or the like, the reading accuracy becomes poor as described before. Usually, a white reference member is read before actually reading the document 7 to make a shading correction so as to improve the reading accuracy. The shading correction electrically corrects outputs of the photoelectric conversion elements depending on the outputs obtained when the white reference member is read. In this embodiment, the outer peripheral surface of the platen roller 28 is basically white, it is possible to make the shading correction by reading the outer peripheral surface of the platen roller 28. In addition, since the platen roller 28 is made of a hard material and not a resilient material used conventionally, dirt does not adhere easily on the platen roller 28. Even when dirt should adhere on the platen roller 28, the dirt can be easily removed by an alcohol remover or the like because the surface of the hard material is easy to clean compared to the surface of the resilient member. Accordingly, the outer peripheral surface of the platen roller 28 can be maintained in the basically white state which is suited for use in the shading correction over a long period of time, and it is possible to always carry out a highly accurate shading correction. Furthermore, the outer peripheral surface of the platen roller 28 is not easily damaged or made dirty by the sliding contact with the document 7 because the minute gap G is formed between the platen roller 28 and the surface of the protection glass 1 and the platen roller 28 rotates at a peripheral speed approximately equal to the transport speed of the document 7. Therefore, the outer peripheral surface of the platen roller 28 can be maintained in the basically white state which is suited for use in the shading correction also for these reasons.

Figure 11:
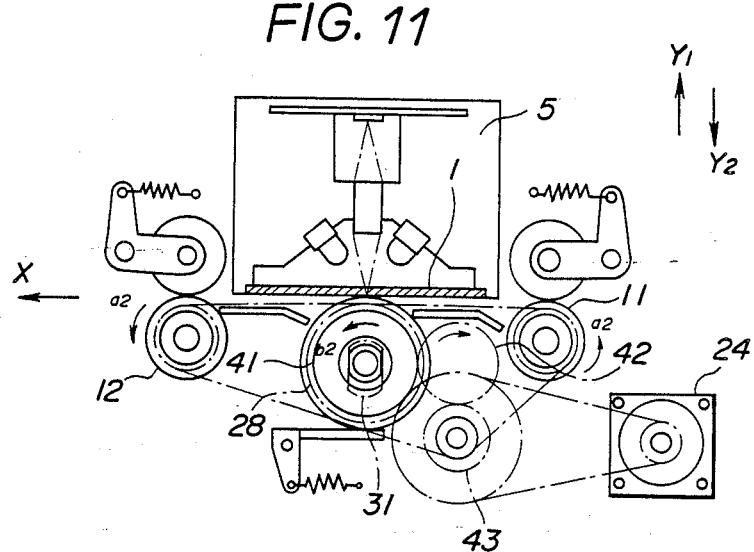
FIG. 11 is a side view showing an essential part of an eighth embodiment of the document reading apparatus according to the present invention.

Next, a description will be given of an eighth embodiment of the document reading apparatus according to the present invention, by referring to FIG. 11. In FIG. 11, those parts which are substantially the same as those corresponding parts in FIGS. 9 and 10 are designated by the same reference numerals, and a description thereof will be omitted. In this embodiment, the idler gear 42 is located at a position different from that of the seventh embodiment. A line connecting centers of the platen roller 28 and the idler gear 42 is approximately parallel to the transport direction X of the document 7. Accordingly, a moving quantity of the platen roller 28 in the direction $Y_2$ away from the surface of the protection glass 1 can be set to a large value, and even the document 7 having a relatively large paper thickness can be transported smoothly.

Figure 12:
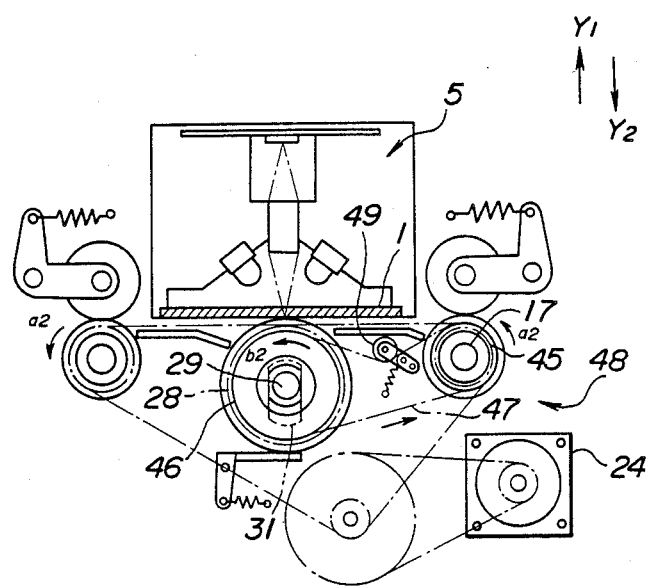
FIG. 12 is a side view showing an essential part of a ninth embodiment of the document reading apparatus according to the present invention.

Next, a description will be given of a ninth embodiment of the document reading apparatus according to the present invention, by referring to FIG. 12. In FIG. 12, those parts which are substantially the same as those corresponding parts in FIGS. 9 and 10 are designated by the same reference numerals, and a description thereof will be omitted. In this embodiment, a driving mechanism 48 is used in place of the driving mechanism 44. This driving mechanism 48 includes driving pulleys 45 and 46 and a driving belt 47. The driving pulley 45 is fixed to the rotary shaft 17, and the driving pulley 46 is fixed to the shaft 29 of the platen roller 28. The driving belt 47 is provided around the driving belts 45 and 46. A tension controller 49 is provided to maintain a tension of the driving belt 47 approximately constant even when a distance between centers of the driving pulleys 45 and 46 changes due to a movement of the platen roller 28 along the elongated hole 31. In addition, because a vertical component of force of the tension acting on the driving belt 47 acts on the platen roller 28 in a direction so as to urge the platen roller 28 towards the protection glass 1, it is possible to prevent the platen roller 28 from moving in the direction $Y_2$ to separate from the rear surface of the document 7 when the platen roller 28 is rotated.

Figure 13:
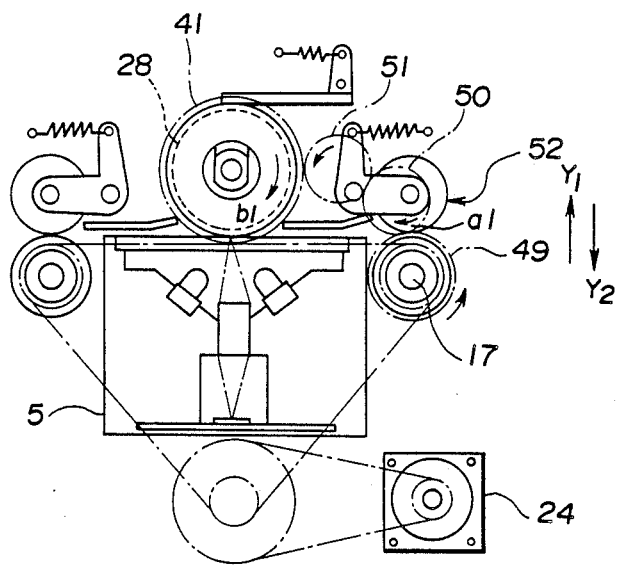
FIG. 13 is a side view showing an essential part of a tenth embodiment of the document reading apparatus according-to the present invention.

Next, a description will be given of a tenth embodiment of the document reading apparatus according to the present invention, by referring to FIG. 13. In FIG. 13, those parts which are substantially the same as those corresponding parts in FIGS. 9 and 10 are designated by the same reference numerals, and a description thereof will be omitted. In this embodiment, the arrangement of the contact type image sensor 5 and the platen roller 28 is upside down to that of the seventh embodiment in that the contact type image sensor 5 is located below the platen roller 28. In addition, a driving mechanism 52 is used to drive the platen roller 28. This driving mechanism 52 includes an idler gear 50 which meshes a gear 49 which is fixed on the rotary shaft 17, an idler gear 51 which meshes the idler gear 50, the gear 41 which meshes the idler gear 51, the driving motor 24 and the like. A line connecting centers of the platen roller 28 and the idler gear 51 is approximately parallel to the transport direction X of the document 7. Accordingly, even when a paper jam occurs and the platen roller 28 is lifted upwardly to remove the paper jam, it is possible to ensure a smooth mesh between the hear 41 and the idler gear 51 when the platen roller 28 is put back to the original position after the paper jam is removed.

Figure 14:
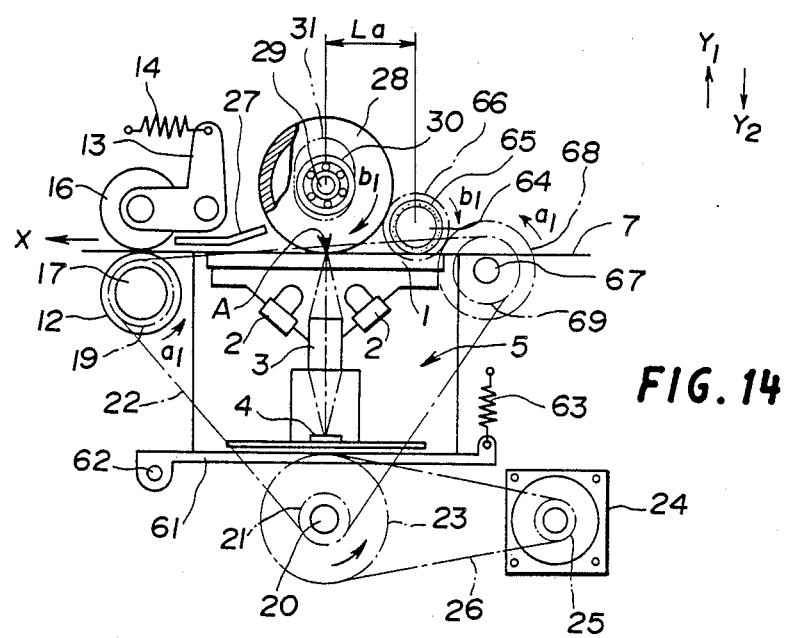
FIG. 14 is a side view showing an essential part of an eleventh embodiment of the document reading apparatus according to the present invention.

Next, a description will be given of an eleventh embodiment of the document reading apparatus according to the present invention, by referring to FIG. 14. In FIG. 14, those parts which are substantially the same as those corresponding parts in FIG. 3 are designated by the same reference numerals, and a description thereof will be omitted. In this embodiment, the contact type image sensor 5 is fixed on a bracket 61. This bracket 61 is pivotally supported on a shaft 62, and a spring 63 urges the bracket 61 to pivot counterclockwise or generally in the direction $Y_1$.

A document transport roller 65 is provided at a position before the platen roller 28 along the transport direction X of the document 7. The document transport roller 65 is rotatably supported on a rotary shaft 64. An outer peripheral portion of the document transport roller 65 is made of a resilient material. An outer peripheral surface of the document transport roller 65 pushes against the surface of the protection glass 1 by the action of the spring 63. The document transport roller 65 is arranged close to the platen roller 28, and a distance La between centers of the platen roller 28 and the document transport roller 65 along the transport direction X is set to an extremely small value in the order of 15 mm, for example. Because the document transport roller 65 makes contact with the surface of the protection glass 1 and there is no need to provide a pressure roller which makes contact with the document transport roller 65, it is possible to arrange the document transport roller 65 sufficiently close to the platen roller 28.

A gear 66 is fixed on the rotary shaft 64, and this gear 66 meshes a gear 68 which is fixed on a rotary shaft 67. A driving pulley 69 is fixed on the rotary shaft 67. The driving belt 22 is provided around the driving pulleys 69, 19, and 21.

When the power source is turned ON and the start button is pushed to start the reading of the document 7, the driving motor 24 is rotated to drive the driving belts 26 and 22 and the driving pulleys 25, 23, 21, 19, 69 and the like, and the document transport roller 12 rotates in the direction a1. In addition, because the gear 68 rotates unitarily with the driving pulley 69, the gear 66 is rotated by the gear 68 and the document transport roller 65 rotates in the direction b1 unitarily with the gear 66.

On the other hand, the document 7 is separated by the document separating and transporting mechanism and reaches the document transport roller 65. The document transport roller 65 rotates in the direction b1 while the outer peripheral surface thereof makes sliding contact with the surface of the protection glass 1, and the document 7 is pinched between the protection glass 1 and the document transport roller 65 and transported in the direction X towards the platen roller 28. When the tip end of the document 7 reaches the document reading position "A", the document 7 enters below the platen roller 28. As a result, the platen roller 28 is pushed upwards in the direction $Y_1$ depending on the paper thickness of the document 7. Because the shafts 29 on both ends of the platen roller 28 are supported by the respective bearings 30 when the platen roller 28 is pushed upwards, a load which acts on the platen roller 28 is small and the platen roller 28 rotates in the direction b1 to help the transport of the document 7. Because the platen roller 28 rotates in the direction b1 and is movable upwardly away from the surface of the protection glass 1, the transport characteristic of the document 7 is improved and a generation of a paper jam is prevented.

At the document reading position "A" where the document 7 is read by the contact type image sensor 5, the document 7 is pushed against the surface of the protection glass 1 by the weight of the platen roller 28. For this reason, the document 7 is prevented from floating from the surface of the protection glass 1 and an out-of-focus state is thus prevented from occurring. In addition, when the paper thickness of the document 7 is large, the platen roller 28 is moved upwardly in the direction $Y_1$ away from the surface of the protection glass 1 and the document 7 can be transported smoothly because the pushing force on the document 7 by the platen roller 28 does not increase. The document 7 which is read reaches the document transport roller 12 and is transported in the direction X in the state pinched between the document transport roller 12 and the pressure roller 16 to be ejected to the document ejection part.

Since the outer peripheral surface of the document transport roller 65 makes sliding contact with the surface of the protection glass 1 and the distance La between the centers of the document transport roller 65 and the platen roller 28 is set to a small value in the order of 15 mm, the document 7 positively enters under the platen roller 28 even when the paper thickness of the document 7 is small, when the stiffness of the document 7 is lost due to a high humidity condition or the like. In other words, the apparent stiffness of the document 7 is improved due to the provision of the document transport roller 65 which is located extremely close to the platen drum 28. Hence, it is possible to prevent a paper jam at the position immediately before the platen drum 28 along the transport direction X even when the paper thickness of the document 7 is small.

Figure 15:
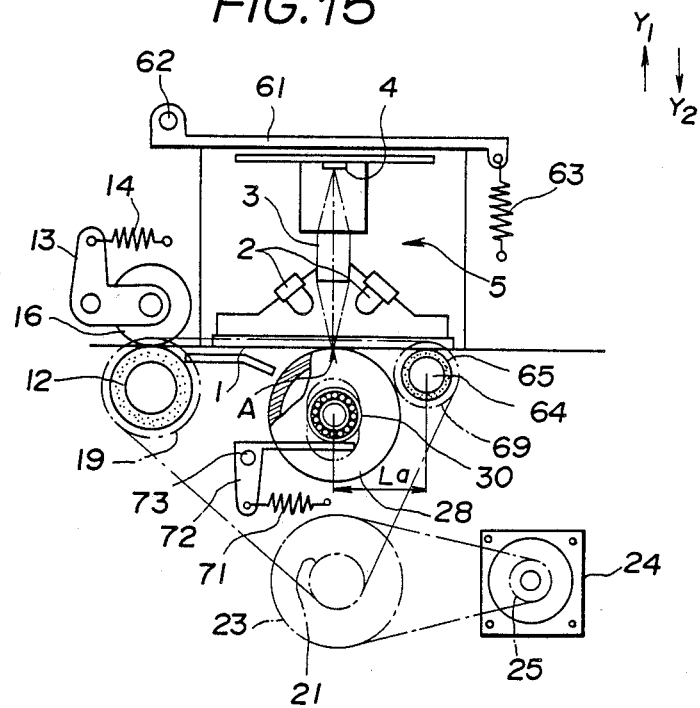
FIG. 15 is a side view showing an essential part of a twelfth embodiment of the document reading apparatus according to the present invention.

Next, a description will be given of a twelfth embodiment of the document reading apparatus according to the present invention, by referring to FIG. 15. In FIG. 15, those parts which are substantially the same as those corresponding parts in FIG. 14 are designated by the same reference numerals, and a description thereof will be omitted. In this embodiment, the arrangement of the contact type image sensor 5 and the platen roller 28 is upside down to that of the eleventh embodiment in that the contact type image sensor 5 is located above the platen roller 28. In addition, an actuator 72 is pivotally supported on a shaft 73, and this actuator 72 is urged counterclockwise or generally in the direction $Y_1$. A tip end of the actuator 72 makes contact with the lower portion of the bearing 30. The driving pulley 69 is fixed on the rotary shaft 64 of the document transport roller 65.

Accordingly, the platen roller 28 is pushed against the surface of the protection glass 1 by the actuator 72, and this pushing action prevents the document 7 from floating from the surface of the protection glass 1 and thereby prevents the out-of-focus state from occurring. The platen roller 28 is pushed downwardly in the direction $Y_2$ as the paper thickness of the document 7 increases, and the pushing force of the actuator 72 increases with the downward movement of the platen roller 28. Since the outer peripheral surface of the document transport roller 65 makes sliding contact with the surface of the protection glass 1 and the distance La between the centers of the document transport roller 65 and the platen roller 28 is set to a small value in the order of 15 mm, the document 7 positively enters above the platen roller 28 even when the paper thickness of the document 7 is small, when the stiffness of the document 7 is lost due to a high humidity condition or the like. In other words, the apparent stiffness of the document 7 is improved due to the provision of the document transport roller 65 which is located extremely close to the platen drum 28. Hence, it is possible to prevent a paper jam at the position immediately before the platen drum 28 along the transport direction X even when the paper thickness of the document 7 is small.

Figure 16:
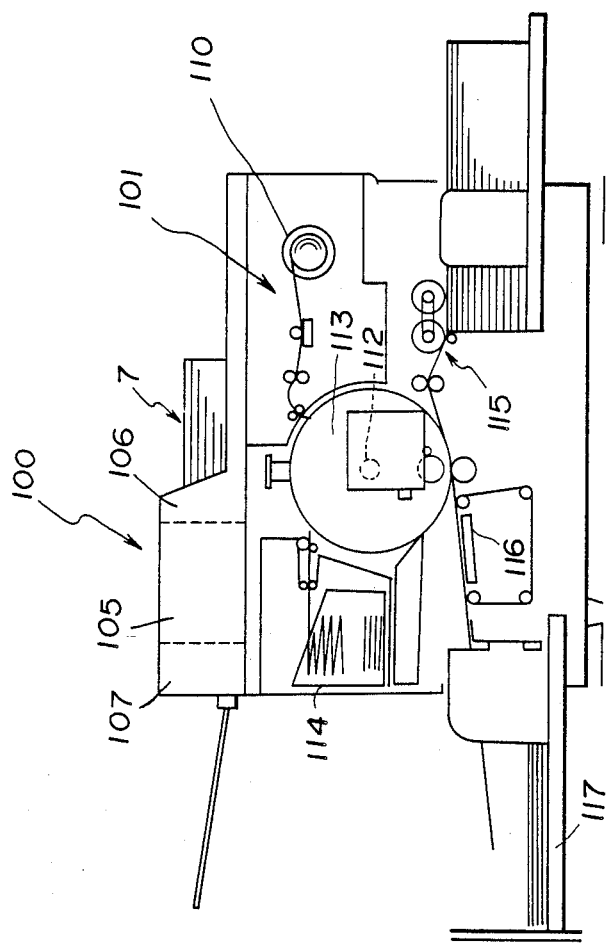
FIG. 16 is a side view generally showing a printing machine to which the present invention may be applied.

Next, a description will be given of a printing machine to which the document reading apparatus according to the present invention may be applied, by referring to FIG. 16. In FIG. 16, the first embodiment of the document reading apparatus is applied to the printing machine for the sake of convenience, but it is of course possible to apply any of the embodiments or modifications thereof to the printing machine shown in FIG. 16.

In FIG. 16, the printing machine generally has a reading part 100 and a printing part 101. The reading part 100 includes a reading unit 105 which is constituted by the first embodiment of the document reading apparatus, a document separating and transporting mechanism 106, and a document ejection part 107. On the other hand, the printing part 101 includes a roll master 110, a thermal head 111, an ink distributor 112, a drum unit 113, a printing sheet recovering part 114, a paper supply unit 115, a vacuum paper ejection unit 116, and a tray 117.

When reading the document 7, the document separating and transporting mechanism 106 separates one document 7 from a plurality of documents 7 and supplies the one document 7 to the reading unit 105. When the document 7 is read by the reading unit 105, an electrical signal describing the document image is supplied from the reading unit 105 to the thermal head 111 of the printing part 101. The read document 7 is ejected via the document ejection part 107. The thermal head 111 forms the document image on a printing sheet which is supplied from the roll master 110. The printing sheet formed with the document image is wrapped around the drum unit 113, and the document image is printed on each piece of paper supplied from the paper supply unit 115 as the drum unit 113 rotates by use of the ink supplied from the ink distributor 112. Each piece of paper having the document image printed thereon is ejected onto the tray 117 via the vacuum paper ejection unit 116. On the other hand, the used printing sheet is recovered into the printing sheet recovering part 114.

Further, the present invention is not limited to these embodiments, but various variations and modifications may be made without departing from the scope of the present invention.

What is claimed is:

1. A document reading apparatus comprising:
   a contact type image sensor having a protection glass located at a surface where a document is to be read;
   first roller means for supplying a document which is to be read in a document transport direction on the protection glass of said contact type image sensor;
   a platen roller which is rotatably supported at a position adjacent the protection glass;
   a support mechanism for rotatably supporting said platen roller, said support mechanism permitting a movement of said platen roller in a predetermined direction which is approximately perpendicular to a surface of said protection glass depending on a thickness of the document which is supplied between said platen roller and the protection glass by said first roller means; and
   restricting means for restricting a position of said platen roller to a predetermined position when no document is inserted between said platen roller and the protection glass so that a predetermined gap is formed between the protection glass and an outer peripheral surface of said platen roller in said predetermined position.

2. The document reading apparatus as claimed in claim 1 wherein at least an outer peripheral portion of said platen roller is made of a hard material selected from a group including metals and plastics.

3. The document reading apparatus as claimed in claim 1 wherein the outer peripheral surface of said platen roller is basically white.

4. The document reading apparatus as claimed in claim 1 wherein said support mechanism includes bearing means for rotatably supporting both ends of said platen roller, sidewalls extending approximately in said predetermined direction, and elongated holes extending in said predetermined direction for supporting said bearings movable along said predetermined direction.

5. The document reading apparatus as claimed in claim 4 wherein said elongated holes constitute said restricting means.

6. The document reading apparatus as claimed in claim 1 wherein said restricting means comprises a pair of large diameter portions provided on both end portions of said platen roller outside a reading range of said contact type image sensor, said large diameter portions having a diameter $D_1$ which is greater than a diameter $D_2$ of a central portion of said platen roller so that said predetermined gap is described by $(D_1-D_2)/2$.

7. The document reading apparatus as claimed in claim 6 wherein said large diameter portions include bearings for rotatably supporting said platen roller.

8. The document reading apparatus as claimed in claim 1 wherein said restricting means comprises a pair of spacers provided on the protection glass to confront both end portions of said platen roller outside a reading range of said contact type image sensor, said spacers having a thickness equal to said predetermined gap.

9. The document reading apparatus as claimed in claim 1 wherein said predetermined gap is selected in a range of approximately 0.05 mm to 0.1 mm.

10. The document reading apparatus as claimed in claim 1 wherein said platen roller pushes the document against the protection glass owing to a weight of said platen roller itself.

11. The document reading apparatus as claimed in claim 10 wherein a pushing force of said platen roller acting on the document against the protection glass is approximately constant regardless of the thickness of the document.

12. The document reading apparatus as claimed in claim 1 which further comprises pushing means for pushing said platen roller towards the protection glass.

13. The document reading apparatus as claimed in claim 12 wherein said pushing means acts on said platen roller only when a gap between the protection glass and the outer peripheral surface of said platen roller exceeds a predetermined value.

14. The document reading apparatus as claimed in claim 12 wherein said pushing means exerts on said platen roller a pushing force which increases as a gap between the protection glass and the outer peripheral surface of said platen roller increases.

15. The document reading apparatus as claimed in claim 1 which further comprises a guide plate provided in a document transport path between said first roller means and said platen roller with a specific gap from the surface of the protection glass.

16. The document reading apparatus as claimed in claim 1 which further comprises driving means for rotating said platen roller.

17. The document reading apparatus as claimed in claim 16 wherein said driving means rotates said platen roller at a peripheral speed approximately equal to a transport speed of the document.

18. The document reading apparatus as claimed in claim 1 which further comprises second roller means for ejecting the document which has passed between the protection glass and said platen roller.

19. The document reading apparatus as claimed in claim 1 wherein said first roller means includes a pair of confronting rollers which supply the document which is pinched between said rollers in the document transport direction which is along the surface of the protection glass and approximately perpendicular to said predetermined direction.

20. The document reading apparatus as claimed in claim 19 wherein at least one of said rollers of said first roller means is urged by a spring to make contact with the other of said rollers.

21. The document reading apparatus as claimed in claim 20 wherein a distance between centers of said platen roller and said one roller of said first roller means along the document transport direction is approximately 30 mm.

22. The document reading apparatus as claimed in claim 1 wherein said first roller means includes a roller which is provided adjacent to said platen roller, said roller of said first roller means making contact with the protection glass.

23. The document reading apparatus as claimed in claim 22 wherein said roller of said first roller means has at least an outer peripheral portion thereof made of a resilient material.

24. The document reading apparatus as claimed in claim 22 which further comprises a bracket which is pivottable for supporting said contact type image sensor, and spring means for urging said bracket to pivot in a direction such that the protection glass makes contact with the outer peripheral surface of said platen roller.

25. The document reading apparatus as claimed in claim 22 which further comprises a bracket which is pivottable for supporting said contact type image sensor, and spring means for urging said bracket to pivot in a direction such that the protection glass approaches the outer peripheral surface of said platen roller with a predetermined gap formed therebetween.

26. The document reading apparatus as claimed in claim 22 wherein a distance between centers of said platen roller and said roller of said first roller means along the document transport direction is approximately 15 mm.

27. The document reading apparatus as claimed in claim 1, wherein said predetermined gap formed between the protection glass and the outer peripheral surface of said platen roller is an air gap.

28. The document reading apparatus as claimed in claim 1 wherein said predetermined gap formed between the protection glass and the outer peripheral surface of said platen roller extends approximately perpendicularly to the surface of the protection glass.

* * * * *